United States Patent
Bartholomy et al.

(10) Patent No.: US 9,104,625 B2
(45) Date of Patent: Aug. 11, 2015

(54) DISASTER RECOVERY INTERNET PROTOCOL ADDRESS FAILOVER

(71) Applicant: International Business Machines Corporation, Armonk, NY (US)

(72) Inventors: Erik Bartholomy, Superior, CO (US); Frank J. Giordano, Richlands, NC (US); Gordan G. Greenlee, Endicott, NY (US); Gourishankar R. Menon, South Glastonbury, CT (US); Victor L. Walter, Hygiene, CO (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/673,098

(22) Filed: Dec. 11, 2012

(65) Prior Publication Data

US 2014/0164817 A1    Jun. 12, 2014

(51) Int. Cl.
*G06F 11/00* (2006.01)
*G06F 11/14* (2006.01)

(52) U.S. Cl.
CPC .................................. *G06F 11/1464* (2013.01)

(58) Field of Classification Search
CPC ..................... G06F 11/1464; H04L 29/06027; H04L 29/12216; H04L 29/12367; H04L 69/40
USPC ........................................................ 714/4.11
See application file for complete search history.

(56) References Cited

U.S. PATENT DOCUMENTS

| | | | |
|---|---|---|---|
| 5,917,997 A * | 6/1999 | Bell et al. ........................ | 714/4.2 |
| 6,108,300 A * | 8/2000 | Coile et al. ..................... | 370/217 |
| 7,139,926 B1 * | 11/2006 | Madhav et al. .............. | 714/4.11 |
| 7,191,327 B2 | 3/2007 | Viljoen et al. | |
| 7,296,182 B2 | 11/2007 | Greenspan et al. | |
| 7,379,990 B2 | 5/2008 | Tsao | |
| 7,451,208 B1 * | 11/2008 | Bakke et al. .................. | 709/224 |
| 7,509,535 B1 | 3/2009 | Gulve et al. | |
| 7,711,983 B2 | 5/2010 | Hatasaki et al. | |
| 7,730,486 B2 | 6/2010 | Herington | |
| 7,818,615 B2 * | 10/2010 | Krajewski et al. .............. | 714/13 |
| 8,051,322 B2 * | 11/2011 | Matsumoto et al. ......... | 714/4.11 |
| 8,095,929 B1 | 1/2012 | Ji et al. | |

(Continued)

FOREIGN PATENT DOCUMENTS

| | | |
|---|---|---|
| CN | 101330643 A | 12/2008 |
| CN | 101924988 A | 12/2010 |

OTHER PUBLICATIONS

Brooks, Office Action Communication for U.S. Appl. No. 12/955,483 dated Aug. 22, 2013, 33 pages.

(Continued)

*Primary Examiner* — Bryce Bonzo
*Assistant Examiner* — Elmira Mehrmanesh
(74) *Attorney, Agent, or Firm* — Mark Vallone; Hoffman Warnick LLC (57) ABSTRACT

An approach is provided for internet protocol (IP) address failover. An application on a primary site is assigned a private IP address. This private IP address is accessible within a local network. This private IP address is mapped to a public IP address, which is accessible to users outside the local network. The application is then replicated to a backup site with the same private IP address used to access it on the primary site. In case of a disaster recover event on the primary site, the replicated application can be accessed on the backup site by way of the public IP address.

19 Claims, 5 Drawing Sheets

(56) References Cited

U.S. PATENT DOCUMENTS

| | | |
|---|---|---|
| 8,261,268 B1 | 9/2012 | Forgette |
| 8,413,146 B1 | 4/2013 | McCorkendale et al. |
| 8,789,048 B2 | 7/2014 | Bozek et al. |
| 2006/0005189 A1 | 1/2006 | Vega et al. |
| 2006/0126619 A1* | 6/2006 | Teisberg et al. ............... 370/389 |
| 2007/0078982 A1 | 4/2007 | Aidun et al. |
| 2008/0313242 A1 | 12/2008 | Doerr |
| 2008/0313424 A1 | 12/2008 | Doerr |
| 2009/0119536 A1 | 5/2009 | Guo et al. |
| 2009/0235265 A1 | 9/2009 | Dawson et al. |
| 2009/0271658 A1 | 10/2009 | Aidun |
| 2009/0313311 A1 | 12/2009 | Hoffmann et al. |
| 2011/0161851 A1 | 6/2011 | Barber et al. |
| 2011/0211440 A1* | 9/2011 | Arsenault et al. ............. 370/217 |
| 2011/0289345 A1 | 11/2011 | Agesen et al. |
| 2012/0136833 A1 | 5/2012 | Bartholomy et al. |
| 2012/0159235 A1 | 6/2012 | Suganthi et al. |
| 2012/0240226 A1 | 9/2012 | Li |
| 2013/0297769 A1 | 11/2013 | Chang et al. |
| 2013/0346803 A1 | 12/2013 | Chiruvolu et al. |

OTHER PUBLICATIONS

Wood et al., "Disaster Recovery as a Cloud Service: Economic Benefits & Deployment Challenges," May 2010, pp. 1-7, University of Massachusetts, retrieved from: http://www.usenix.org/event/hotcloud10/tech/full_papers/Wood.pdf.

Kahane et al., "Computer Backup Pools, Disaster Recovery, and Default Risk," Jan. 1988, pp. 78-83, Communications of the ACM, vol. 31, No. 1.

Maffei et al., "Remote Dual Copy: Hot Backup Site Now a Reality, But, at What Cost,"Dec. 1997, 1 page (Abstract), The 1997 23rd International Conference for the Resource Management & Performance Evaluation of Enterprise Computing Systems, Part 2 (of 2), CSA Technology Research Database.

Synergistic Online Solutions, Disaster Recovery, SynergisticHotSite, retrieved from: http://www.synergisticonline.com/dr.html#hotsite, 3 pages.

Chen et al., "The Challenge and Solutions of NAT Traversal for Ubiquitous and Pervasive Applications on the Internet," 2009, pp. 1620-1626, The Journal of Systems and Software, vol. 82.

Volz et al., "The Dynamic Host Configuration Protocol (DHCP) Client Fully Qualified Domain Name (FQDN) Option (RFC4702)," Oct. 2006, 19 pages, Internet Society Requests for Comment (RFCs), IPCOM000142378D.

Brooks, Office Action Communication for U.S. Appl. No. 12/955,483 dated Jun. 19, 2013, 35 pages.

Brooks, Office Action Communication for U.S. Appl. No. 12/955,483 dated Jan. 17, 2013, 31 pages.

International application No. PCT/ CN2013 /084936, International Search Report and Written Opinion, dated Jan. 16, 2014, 12 pages.

U.S. Appl. No. 12/955,483, Notice of Allowance & Fees Due, Feb. 14, 2014, 12 pages.

Schell, Office Action Communication for U.S. Appl. No. 13/665,574 dated Sep. 11, 2014, 36 pages.

Schell, Office Action Communication for U.S. Appl. No. 13/665,574 dated Feb. 20, 2015, 26 pages.

Schell, Notice of Allowance and Fee(s) Due for U.S. Appl. No. 13/665,574 dated Mar. 27, 2015, (IBME-0520), 6 pages.

Moses et al., "Shared Resource Monitoring and Throughput Optimization in Cloud-Computing Datacenters," 2011, pp. 1024-1033, IEEE International Parallel & Distributed Processing Symposium.

* cited by examiner

DISASTER RECOVERY INTERNET PROTOCOL ADDRESS FAILOVER

TECHNICAL FIELD

The subject matter of this invention relates generally to disaster recovery. More specifically, aspects of the present invention provide a solution for failing over an internet protocol address for purposes of disaster recovery.

BACKGROUND

Computer applications are pieces of computer software that help a user thereof perform a task or a number of related tasks. In the electronic environment of today, these applications are often provided in such a way as to be accessible to a number of users. To accomplish this, a provider of the application may host the application from a particular location that is accessible via a network, such as a local area network or wide area network, such as the Internet.

In hosting the application, the provider usually hopes to attain a state in which the application is available to users in a continuous manner. However, sometimes problems arise that may cause availability to be interrupted. For example, a catastrophic disaster, such as an earthquake, fire, etc., could occur at the primary host site. In the alternative, the machine or machines may experience hardware and/or software malfunctions that cause the application to cease performing. Alternatively, communications between the host site and the network may be lost, resulting in an inability of users to access the application. When these events occur, providers often perform disaster recovery to restore application functionality to users. Often this disaster recovery includes executing the application at a secondary site where it has previously been stored.

One more recent solution (described in U.S. patent application Ser. No. 12/955,483 provides a solution for implementing disaster recovery for an application. A subscription backup site for the application is selected from among a plurality of sites. The site that is selected will have a virtual space that is able to accommodate the workload requirements for the application. The application is deflated on the site in such a way as to operate in a dormant state. In the dormant state, the application has a small fraction of its required resources allocated to it. Thereafter, when disaster recovery is needed, the application can be inflated on the subscription backup site by allocating resources to enable the application to execute on the subscription backup site.

One technical challenge that can occur during disaster recovery involves the manner in which the application is located for access by users when the execution of the application moves from the primary site to the backup site. For example, an internet protocol (IP) address can be assigned to an entire server, e.g., the primary site. In many applications, the IP address of this server must be unique (on a public network) to those accessing the server. For this reason, in these applications, the backup site cannot be actively using the IP address at the same time as the primary site (unless the subnet remains unroutable). However, when disaster recovery is required, a user that attempts to access an application on the backup site should be able to do so using the IP address that is familiar to the user, e.g., that of the primary site.

SUMMARY

In general, aspects of the present invention provide an approach for internet protocol (IP) address failover. An application on a primary site is assigned a private IP address. This private IP address is accessible within a local network. This private IP address is mapped to a public IP address, which is accessible to users outside the local network. The application is then replicated to a backup site with the same private IP address used to access it on the primary site. In case of a disaster recover event on the primary site, the replicated application can be accessed on the backup site by way of the public IP address.

A first aspect of the invention provides a method for disaster recovery internet protocol (IP) address failover, the method comprising: assigning a private IP address to an application on a primary site, the private IP address being accessible within a local network; mapping a public IP address to the private IP address, the public IP address being accessible to users outside the local network; replicating the application to a backup site, the replicated application having the private IP address assigned to the application on the primary site; and in response to a disaster recovery (DR) event, accessing the replicated application on the backup site via the public IP address.

A second aspect of the invention provides A system for disaster recovery internet protocol (IP) address failover, the system comprising at least one computer device comprising a processor and a computer readable storage medium, said storage medium containing program instructions configured to be executed by the processor to implement a method, the method comprising: assigning a private IP address to an application on a primary site, the private IP address being accessible within a local network; mapping a public IP address to the private IP address, the public IP address being accessible to users outside the local network; replicating the application to a backup site, the replicated application having the private IP address assigned to the application on the primary site; and in response to a disaster recovery (DR) event, accessing the replicated application on the backup site via the public IP address.

A third aspect of the invention provides a computer program product comprising a computer readable storage medium having program instructions stored therein, said program instructions configured to be executed by a processor of a computer system to implement a method for disaster recovery internet protocol (IP) address failover, the method comprising: assigning a private IP address to an application on a primary site, the private IP address being accessible within a local network; mapping a public IP address to the private IP address, the public IP address being accessible to users outside the local network; replicating the application to a backup site, the replicated application having the private IP address assigned to the application on the primary site; and in response to a disaster recovery (DR) event, accessing the replicated application on the backup site via the public IP address.

A method for deploying a system for disaster recovery internet protocol (IP) address failover, the method comprising, providing a computer system operable to: assign a private IP address to an application on a primary site, the private IP address being accessible within a local network; map a public IP address to the private IP address, the public IP address being accessible to users outside the local network; replicate the application to a backup site, the replicated application having the private IP address assigned to the application on the primary site; and in response to a disaster recovery (DR) event, access the replicated application on the backup site via the public IP address.

Still yet, any of the components of the present invention could be deployed, managed, serviced, etc., by a service provider who offers to provide a service for failover of an IP address.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Applicants have discovered that current solutions for failing-over IP addresses for disaster recovery have deficiencies. For example, solutions that failover the IP address for an entire Data Center with subnets and servers to a secondary site require that all applications on the site server to be backed up to the same secondary site. In cases in which a large number of applications reside at a site on a server this can require a large amount of resources, some of which may be for applications that do not need to be backed up and are thus wasted. In the alternative, solutions which utilize a conduit, such as a local area network (LAN) bridge or an IP bridge gateway require dedicated hardware devices and/or connections that are only used in case of disaster recovery. In addition, these devices and/or connections can cause bottlenecks for those attempting to connect to the backup site, potentially restricting access to the backup site. In other instances in which an entirely new IP address is used for applications on the backup site, any applications that are copied from the primary site to the backup site must be modified to change the IP address to the new IP address, which can be time consuming and mistake prone. Further, upon a disaster recovery event the old IP address must be mapped to the new IP address for routing purposes.

As indicated above, aspects of the present invention provide an approach for internet protocol (IP) address failover. An application on a primary site is assigned a private IP address. This private IP address is accessible within a local network. This private IP address is mapped to a public IP address, which is accessible to users outside the local network. The application is then replicated to a backup site with the same private IP address used to access it on the primary site. In case of a disaster recovery event on the primary site, the replicated application can be accessed on the backup site by way of the public IP address.

Figure 1:
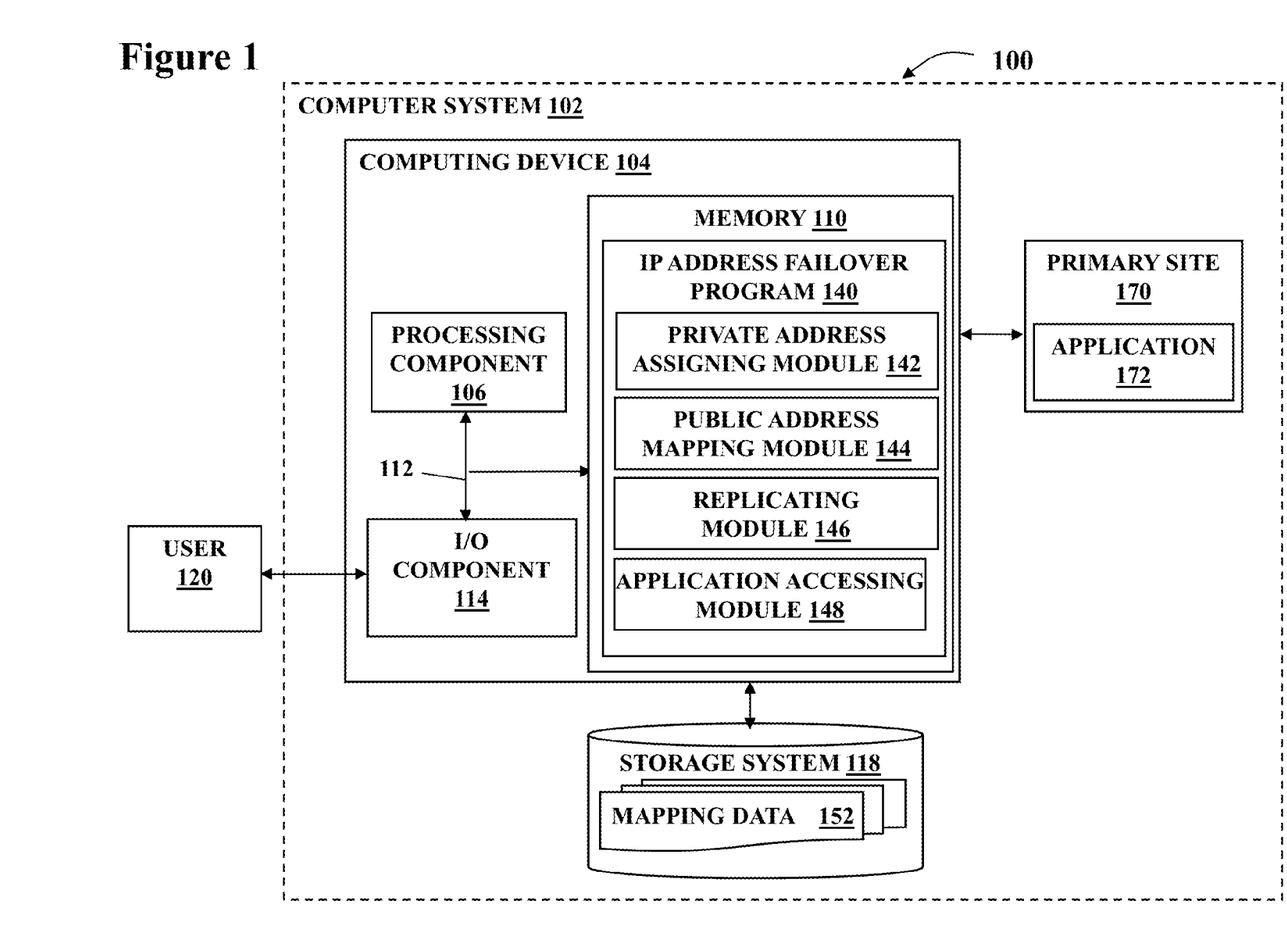
FIG. 1 shows a data processing environment suitable for implementing an embodiment of the present invention.

Turning to the drawings, FIG. 1 shows a data processing environment 100 suitable for implementing an embodiment of the present invention. To this extent, environment 100 includes a computer system 102 that can perform a process described herein in order to failover an IP address. In particular, computer system 102 is shown including a computing device 104 that includes a IP address failover program 140, which makes computing device 104 operable to failover an IP address by performing a process described herein.

Computing device 104 is shown including a processing component 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing component 106 executes program code, such as program code of IP address failover program 140. IP address failover program 140 is at least partially fixed in memory 110. To this extent, processing component 106 may comprise a single processing unit, or be distributed across one or more processing units in one or more locations, e.g., on a client and server.

Memory 110 can also include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of data storage and/or transmission media, including magnetic media, optical media, random access memory (RAM), read-only memory (ROM), a data cache, a data object, etc. Moreover, similar to processing component 106, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, IP address failover program 140 can manage a set of interfaces (e.g., graphical user interface(s), application program interface, and/or the like) that enable human and/or system users 120 to interact with IP address failover program 140, e.g., to failover an IP address for an application 172 on a primary system 170. Users 120 could include network administrators, disaster planners and/or anyone else who needs to insure that application 172 is accessible during a DR event. Further, IP address failover program 140 can manage (e.g., store, retrieve, create, manipulate, organize, present, etc.) the data, such as one or pieces of mapping data 152 (e.g., a private IP address, public IP address, Network Address Translation (NAT) and/or the like), using any solution.

In any event, computer system 102 can comprise one or more general purpose computing articles of manufacture 104 (e.g., computing devices) capable of executing program code, such as IP address failover program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, IP address failover program 140 can be embodied as any combination of system software and/or application software. In any event, the technical effect of computer system 102 is to provide processing instructions to computing device 104 in order to failover an IP address.

Further, IP address failover program 140 can be implemented using a set of modules 142-148. In this case, modules 142-148 can enable computer system 102 to perform a set of tasks used by IP address failover program 140, and can be separately developed and/or implemented apart from other portions of IP address failover program 140. As used herein, the term "component" or "element" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 could have only a portion of IP address failover program 140 fixed thereon (e.g., one or more modules 142-148). However, it is understood that computer system 102 and IP address failover program 140 are only representative of various possible equivalent computer systems that may perform a process described herein. To this extent, in other embodiments, the functionality provided by computer system 102 and IP address failover program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, IP address failover program 140 (DR implementation) enables computer system 102 to failover an IP address. To this extent, IP address failover program 140 is shown including a private address assigning module 142, a public address mapping module 144, a replicating module 146, and an application accessing module 148.

Figure 2:
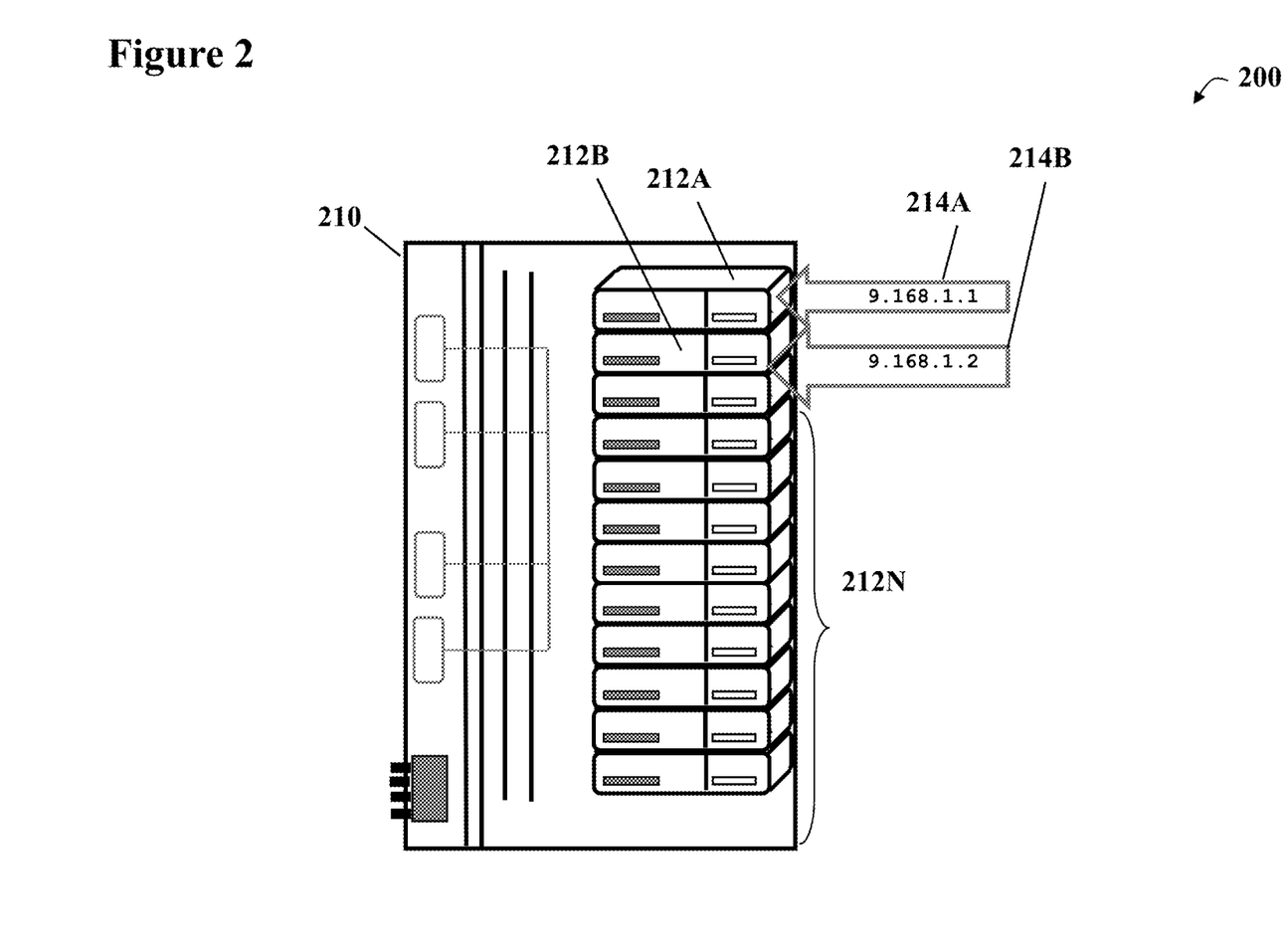
FIG. 2 shows an assignment of a private IP address according to an embodiment of the invention.

Referring now to FIG. 2, an assignment of a private IP address 214A, 214B according to an embodiment of the invention is shown. As illustrated, a primary site 210 is shown. Primary site 210 can include a physical server, a group of physical servers, a logical partition within a physical server, a working partition within a physical server, and/or the like. Primary site 210 includes a group of applications 212A-N. In an embodiment, primary site 210 can be a virtual datacenter environment. In this embodiment, primary site 210 is a physical server having applications 212A-N that can include one or more virtual servers. Each instance of applications 212A-N that is a virtual server on a particular physical server can operate simultaneously with other systems instances of virtual server applications 212A-N while maintaining independence.

In any case, turning now to FIG. 1 in conjunction with FIG. 2, private address assigning module 142, as executed by computer system 102, can assign a private IP address 214A, 214B to application 212A, 212B on primary site 210. As shown, private IP address 214A has been assigned to a single application 212A. In contrast, IP address 214B has been assigned to a group (in this case, two) of multiple applications 212B. This group of multiple applications 212B can be designated based on operating environment (common operating system, software tools, and/or the like), operating characteristics (memory usage, cache utilization, and/or the like) and/or any other way of grouping applications now known or later developed. In any case, private IP address 214A, 214B is an IP address that is accessible within a local network. To this extent, private IP address 214A, 214B may not be accessible outside the local network. For example, a common personal router may assign private IP addresses having the format 192.168.1.x to devices connected thereto. Similarly, a corporate network may be assigned addresses along the lines of 9.x.x.x, such as 9.168.1.1 and 9.168.1.2 assigned to applications 212A, 212B in the figure. It should be understood that other naming conventions for assigned private IP addresses 214A, 214B are envisioned.

Turning back to FIG. 1, public address mapping module 144, as executed by computer system 102, can map a public IP address with the private IP address 214A, 214B (FIG. 2) assigned to application 212A, 212B. This public IP address can be accessible to users outside the local network on which the private IP address is recognized. This public address can be mapped to the private address on a one-to-one basis, or, in the alternative, can use any mapping solution now known or later developed. In an embodiment, this mapping can be performed using Network Address Translation (NAT) protocols.

Figure 3:
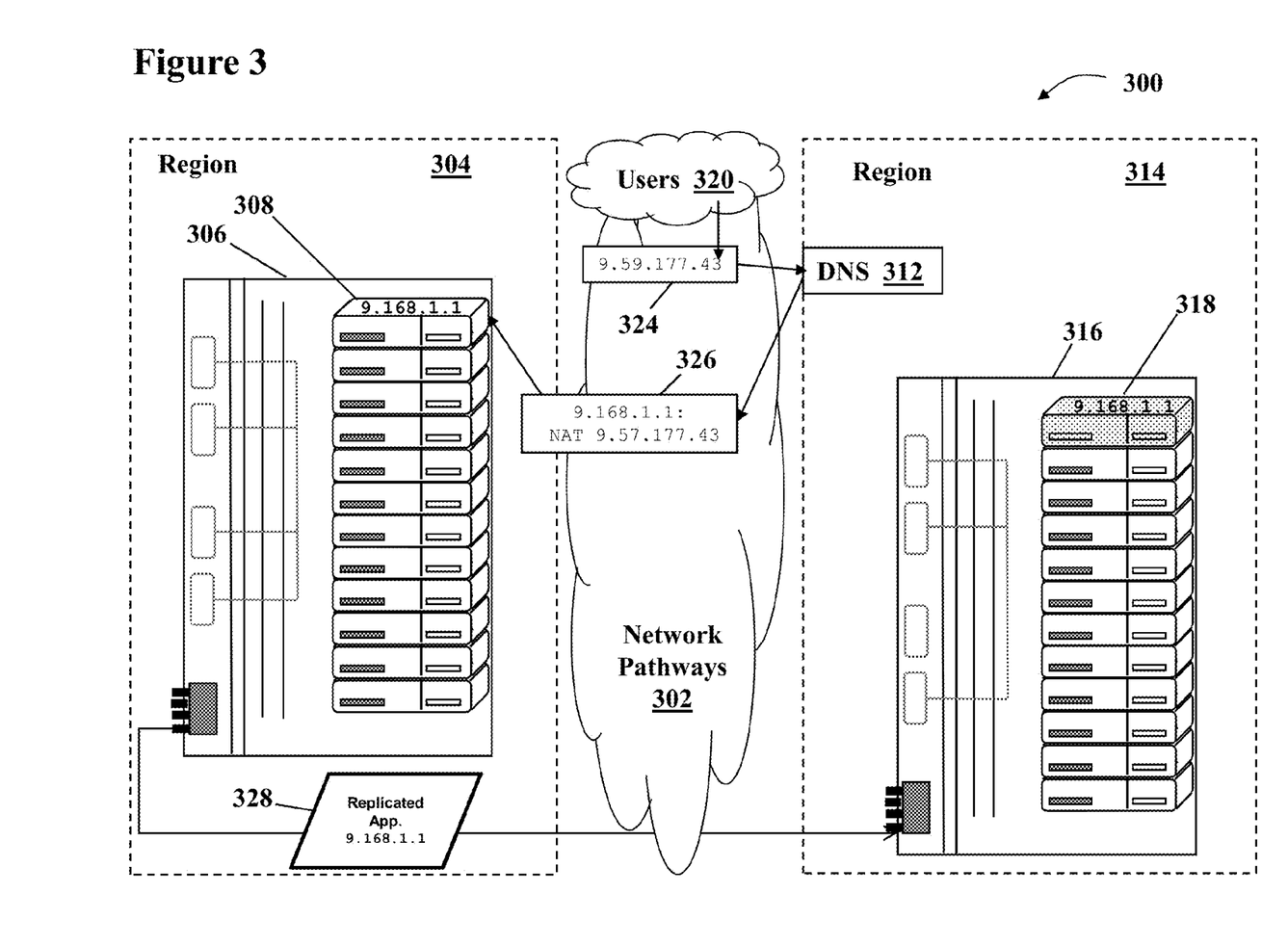
FIG. 3 shows an example production environment according to an embodiment of the invention.

Turning now to FIG. 3, an example production environment 300 according to an embodiment of the invention is shown. As shown, production environment 300 contains a number of regions 304, 314, two of which are shown. Each of these regions 304, 314 can represent a particular geographical designation (city, region, country, landmass, continent, etc.). So, for example, region 304 could include some or all of Japan, while region 314 could be a region within the United States. To this extent, one or more of the regions 304, 314 could be geographically distant from any or all of the other regions 304, 314. In any case, as illustrated, each region 304, 314 can have a number of sites 306, 316, one of which is shown in each region 304, 314 for purposes of illustration. Any or all of sites 306, 316 can include one or more frames, one or more physical servers, one or more virtual servers, one or more virtual server groups, and/or the like. As shown, a primary site 306 hosts a number of production applications, including an application 308 for which DR is desired. As shown, application 308 has been assigned private IP address 9.168.1.1. A user 320 that desires to access application 308 submits a communication 324 via network pathways 302 using the public IP address (9.59.177.43) that has been mapped to the private address 9.168.1.1. This communication 324 is processed by a domain name system (DNS) 312 using the public IP address, which retrieves the private IP address based on the mapping. 326, here illustrated using NAT. This mapping could also include an intermediate mapping to a local public IP address, in this case 9.57.177.42, where the public IP address is mapped to the local public IP address, which is mapped to the private IP address. User 320 can then be routed to application 308 via the public IP address, the local public IP address (if used) and the private IP address using the mapping 326.

Turning back to FIG. 1 in conjunction with FIG. 3, replicating module 146, as executed by computer system 102, replicates application 308 to a backup site 316. As illustrated, replicating module 146 is replicating application 308 by sending replicated app 328 over a dedicated connection, such as over a virtual private network (VPN) connection, although any other solution for replicating data is envisioned. To this extent, backup site 316 can function as a mirror site for all or part of production site. Replicated app 328 can include the entirety of application 308 for transfer to backup site 316 or, in the alternative, can include data designed to incrementally update a replicated application 318. In any event, in an embodiment, replicated application 318 on backup site 316 is as close to identical to application 308 as possible. To this extent, replicated app 328 retains the same private IP address (9.168.1.1) as application 308. This results in a replicated application 318 on backup site 316 that has retains the private IP address of application 308. The identical nature of the private IP addresses eliminates the need to examine replicated app 328 as replication is occurring and/or replicated application 318 after replication has occurred to insure that the IP address of replicated application 318 has been changed to an IP address that can be used for purpose of DR. As illustrated, replicated application 318 is shown having a dotted fill pattern. This is meant to illustrate replicated application 318 as being dormant on backup site 316 during a normal production environment, that is, until a DR event occurs, although other embodiments are envisioned.

Figure 4:
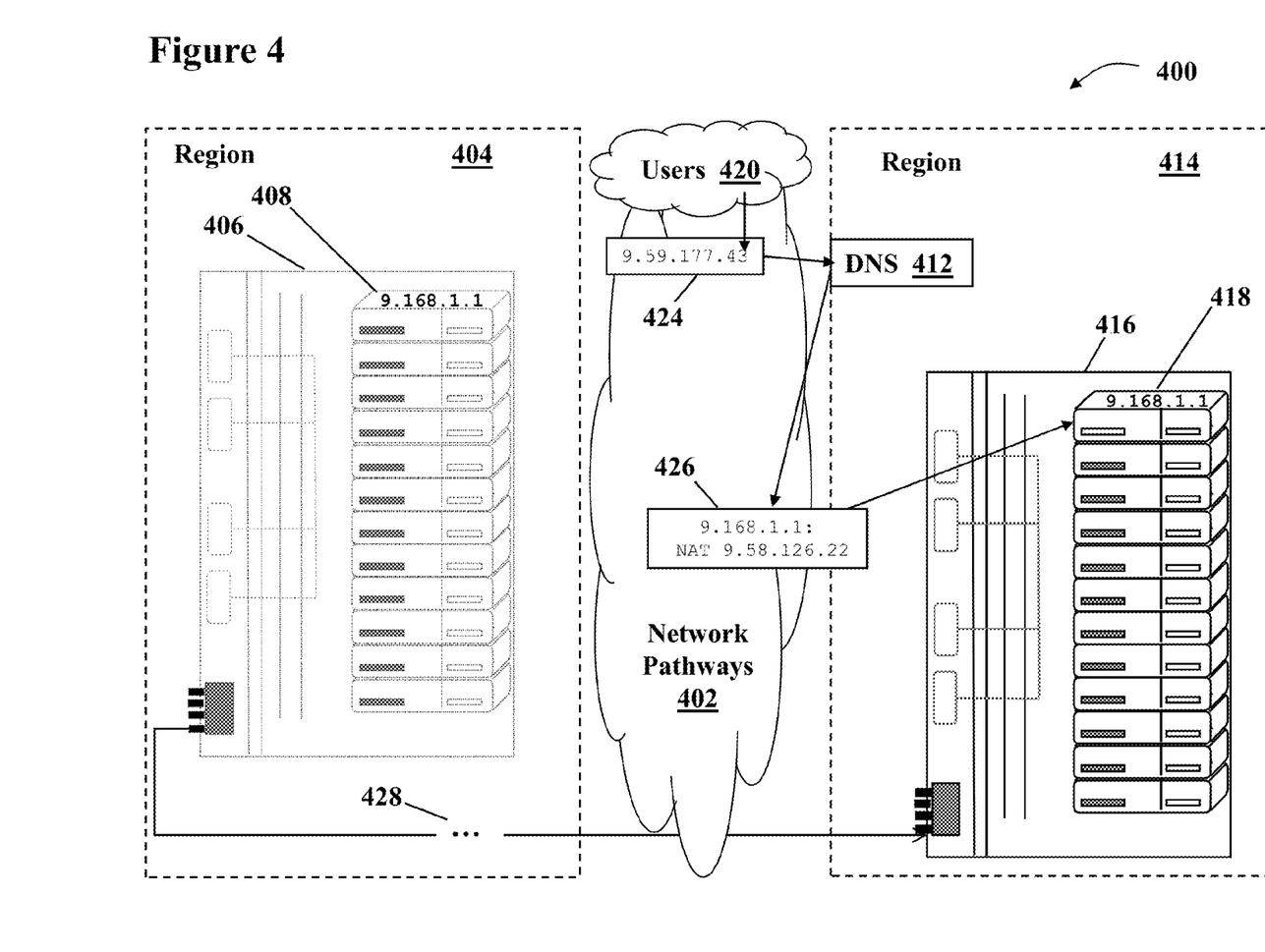
FIG. 4 shows an example DR event according to an embodiment of the invention.

Turning now to FIG. 4, an example DR event 400 according to an embodiment of the invention is shown. As illustrated, graph representation primary site 406 in region 404 is shown as being in shadow, indicating a disaster of some sort has occurred at primary site 406. Because of this application 408 on primary site 406 is inaccessible by users 420. As can also be seen, in this scenario, an interruption 428 has also occurred in the replication of application 408 to backup site 416 in region 414. As a result of the disaster, DR has been performed on backup site 416, resulting in replicated application 418 being activated on backup site 416.

Turning now to FIG. 1 in conjunction with FIG. 4, application accessing module 148, as executed by computer system 102, accesses the replicated application 418 on the backup site 416 in response to a DR event. This access can occur using the same public IP address that was previously used to access application 408 on production site 406. Thus, users 420 attempting to access application 406 via network pathways 402 can use their accustomed public IP address (and/or a public hostname associated therewith) and will be directed to replicated application 418 without the user 420 noticing any difference. For example, subsequent to the DR event, a communication 424 that is received from a user 420 using the public IP address will again be routed to DNS 412. DNS 412 can then, in the case of an intermediate mapping, translate the public IP address to a backup local public IP address. In this case, the backup local public IP address can be different from the local public IP address. As illustrated, the backup local public IP address is 9.58.126.22, which is different from the local public IP address used to route the request in 324 in FIG. 3 to the primary site 306. This difference between the backup public IP address and the local public IP address can serve to indicate that the application, rather than being hosted on primary site 406 is being hosted on backup site. The private IP address can then be retrieved, such as by NAT mapping 426, using the backup local public IP address. The user 420 can then be routed to replicated application 418 via the public IP address, the backup local public IP address (if used) and the private IP address.

Because the routing of requests during a DR is performed using the same DNS as is used during production, no additional equipment, such as a LAN bridge and/or IP bridge gateway is required. Additionally, the potential bottlenecks that are possible using these solutions are eliminated. Further, the private IP addresses are application-based. One application having a private IP address can be replicated to a backup site while a second application having a second private IP address can be replicated to a second site and either or both can be reactivated as needed in case of a DR event using the same procedure on their respective servers. Still further, an administrator can choose what is to be replicated on an application by application basis, reducing replication of non-critical applications. Yet still further, testing can be performed on an application-by-application basis to insure that each application will be able to be accessed in case of a DR event without needing to restart an entire site.

Figure 5:
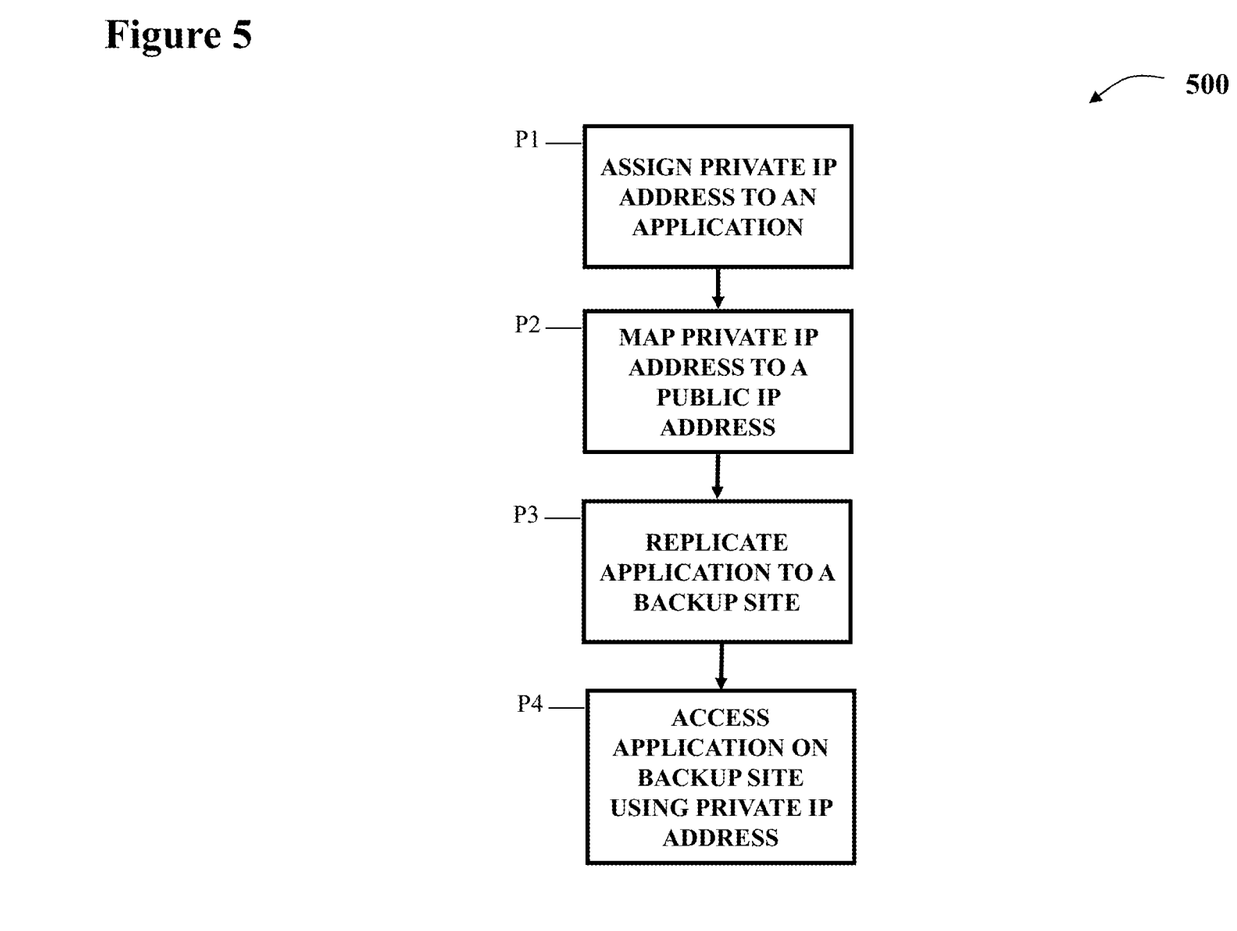
FIG. 5 shows an example flow diagram according to an embodiment of the invention.

Turning now to FIG. 5, an example flow diagram 500 according to an embodiment of the invention is shown. Referring to FIG. 5 in conjunction with FIG. 1, as illustrated, in P1, private address assigning module 142, as executed by computer system 102, assigns a private IP address 214A, 214B to an application 212A, 212B (FIG. 2). This private IP address is accessible within a local network. (See e.g., region 304, 314; FIG. 3). This local network can be a private zone that is not accessible to users 120 outside the local network. In P2, public address mapping module 144, as executed by computer system 102, maps a public IP address that is accessible to users outside the local network with the private IP address. This mapping can be performed using NAT. In P3, replicating module 146, as executed by computer system 102, replicates application 308 (FIG. 3) to a backup site 316. The replication results in the replicated application 318 (FIG. 3) having the same private IP address as that which was assigned to the application 308 on the primary site 306. In P4, application accessing module 148, as executed by computer system 102, uses the mapping 426 (FIG. 4) to access the replicated application 418 on the backup site 416 having the replicated private IP address using the same public IP address.

While shown and described herein as a method and system for IP address failover, it is understood that aspects of the invention further provide various alternative embodiments. For example, in one embodiment, the invention provides a computer program fixed in at least one computer-readable medium, which when executed, enables a computer system to failover an IP address. To this extent, the computer-readable medium includes program code, such as IP address failover program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as IP address failover program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for IP address failover. In this case, a computer system, such as computer system 102 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if/as used herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" if/as used herein is intended to include both the singular and the plural of the term that it modifies, thereby including one or more of that term. Ranges if/as disclosed herein are inclusive and independently combinable (e.g., ranges of "up to approximately 25%, or, more specifically, approximately 5% to approximately 20%", is inclusive of the endpoints and all intermediate values of the ranges of "approximately 5% to approximately 25%," etc.).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for disaster recovery internet protocol (IP) address failover, the method comprising:
   assigning a private IP address to an application on a primary site, the private IP address being accessible within a local network;
   mapping a public IP address to the private IP address, the public IP address being accessible to a plurality of users outside the local network;
   replicating the application to a backup site, the replicated application having the private IP address assigned to the application on the primary site; and
   in response to a disaster recovery (DR) event, accessing via a domain name system the replicated application on the backup site via the public IP address, wherein the domain name system translates the public IP address to a backup local public IP address, wherein the backup local public IP address is different from the public IP address;
   comparing the public IP address and the backup local public IP address for detecting a difference;
   indicating, in response to the detecting, the application is hosted on the backup site; and
   in response to a request for the application from at least one user, providing the at least one user with access to the replicated application at the back up site via the public IP address, the backup local public IP address and the private IP address.

2. The method of claim 1, wherein the replicated application resides in a dormant state on the backup site prior to the DR event.

3. The method of claim 2, wherein the accessing further comprises activating the replicated application on the backup site.

4. The method of claim 1, wherein the mapping is performed using a Network Address Translation (NAT) protocol.

5. The method of claim 1, further comprising:
   assigning a second private IP address to a second application on the primary site;
   mapping a second public IP address with the second private IP address;
   replicating the second application to a different backup site, the replicated application having the second private IP address assigned to the second application on the second primary site; and
   in response to a disaster recovery (DR) event, accessing the second replicated application on the different backup site via the second public IP address.

6. The method of claim 1, further comprising:
   receiving, prior to the DR event, a communication to access the application from a user using the public IP address;
   retrieving, using the public IP address, the private IP address; and
   routing the user to the application via the public IP address and the private IP address.

7. A system for disaster recovery internet protocol (IP) address failover, the system comprising at least one computer device comprising a processor and a non-transitory computer readable storage medium, said storage medium containing program instructions configured to be executed by the processor to implement a method, the method comprising:
   assigning a private IP address to an application on a primary site, the private IP address being accessible within a local network;
   mapping a public IP address to the private IP address, the public IP address being accessible to a plurality of users outside the local network;
   replicating the application to a backup site, the replicated application having the private IP address assigned to the application on the primary site; and
   in response to a disaster recovery (DR) event, accessing via a domain name system the replicated application on the backup site via the public IP address, wherein the domain name system translates the public IP address to a backup local public IP address, wherein the backup local public IP address is different from the public IP address;

comparing the public IP address and the backup local public IP address for detecting a difference;

indicating, in response to the detecting, the application is hosted on the backup site; and in response to a request for the application from at least one user, providing the at least one user with access to the replicated application at the back up site via the public IP address, the backup public IP address and the private IP address.

8. The system of claim 7, wherein the replicated application resides in a dormant state on the backup site prior to the DR event.

9. The system of claim 8, wherein the accessing further comprises activating the replicated application on the backup site.

10. The system of claim 7, wherein the mapping is performed using a Network Address Translation (NAT) protocol.

11. The system of claim 7, wherein the method further comprises:
- assigning a second private IP address to a second application on the primary site;
- mapping a second public IP address with the second private IP address;
- replicating the second application to a different backup site, the replicated application having the second private IP address assigned to the second application on the second primary site; and
- in response to a disaster recovery (DR) event, accessing the second replicated application on the different backup site via the second public IP address.

12. The system of claim 7, wherein the method further comprises:
- receiving, prior to the DR event, a communication to access the application from a user using the public IP address;
- retrieving, using the public IP address, the private IP address; and
- routing the user to the application via the public IP address and the private IP address.

13. A computer program product comprising a non-transitory computer readable storage medium having program instructions stored therein, said program instructions configured to be executed by a processor of a computer system to implement a method for disaster recovery internet protocol (IP) address failover, the method comprising:
- assigning a private IP address to an application on a primary site, the private IP address being accessible within a local network;
- mapping a public IP address to the private IP address, the public IP address being accessible to a plurality of users outside the local network;
- replicating the application to a backup site, the replicated application having the private IP address assigned to the application on the primary site; and
- in response to a disaster recovery (DR) event, accessing via a domain name system the replicated application on the backup site via the public IP address, wherein the domain name system translates the public IP address to a backup local public IP address, wherein the backup local public IP address is different from the public IP address;
- comparing the public IP address and the backup local public IP address for detecting a difference;
- indicating, in response to the detecting, the application is hosted on the backup site; and
- in response to a request for the application from at least one user, providing the at least one user with access to the replicated application at the back up site via the public IP address, the backup public IP address and the private IP address.

14. The computer program product of claim 13, wherein the replicated application resides in a dormant state on the backup site prior to the DR event.

15. The computer program product of claim 14, wherein the accessing further comprises activating the replicated application on the backup site.

16. The computer program product of claim 13, wherein the mapping is performed using a Network Address Translation (NAT) protocol.

17. The computer program product of claim 13, wherein the method further comprises:
- assigning a second private IP address to a second application on the primary site;
- mapping a second public IP address to the second private IP address;
- replicating the second application to a different backup site, the replicated application having the second private IP address assigned to the second application on the second primary site; and
- in response to a disaster recovery (DR) event, accessing the second replicated application on the different backup site via the second public IP address.

18. The computer program product of claim 13, wherein the method further comprises:
- receiving, prior to the DR event, a communication to access the application from a user using the public IP address;
- retrieving, using the public IP address, the private IP address; and
- routing the user to the application via the public IP address and the private IP address.

19. A method for deploying a system for disaster recovery internet protocol (IP) address failover, the method comprising,
providing a computer system operable to:
- assign a private IP address to an application on a primary site, the private IP address being accessible within a local network;
- map a public IP address to the private IP address, the public IP address being accessible to a plurality of users outside the local network;
- replicate the application to a backup site, the replicated application having the private IP address assigned to the application on the primary site; and
- in response to a disaster recovery (DR) event, access via a domain name system the replicated application on the backup site via the public IP address, wherein the domain name system translates the public IP address to a backup local public IP address, wherein the backup local public IP address is different from the public IP address;
- compare the public IP address and the backup local public IP address for detecting a difference;
- indicate, in response to the detecting, the application is hosted on the backup site; and
- in response to a request for the application from at least one user, provide the at least one user with access to the replicated application at the back up site via the public IP address, the backup public IP address and the private IP address.

* * * * *